(12) United States Patent
Sexton et al.

(10) Patent No.: US 6,760,825 B1
(45) Date of Patent: Jul. 6, 2004

(54) MEMORY MANAGEMENT USING MIGRATION FOR A RUN-TIME ENVIRONMENT

(75) Inventors: Harlan Sexton, Palo Alto, CA (US); David Unietis, Menlo Park, CA (US); Peter Benson, Boulder, UT (US); Mark Jungerman, San Francisco, CA (US); Scott Meyer, Pacifica, CA (US); David Rosenberg, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/515,889

(22) Filed: Feb. 29, 2000

Related U.S. Application Data
(60) Provisional application No. 60/185,136, filed on Feb. 25, 2000, provisional application No. 60/185,139, filed on Feb. 25, 2000, provisional application No. 60/185,138, filed on Feb. 25, 2000, provisional application No. 60/185,134, filed on Feb. 25, 2000, provisional application No. 60/185,137, filed on Feb. 25, 2000, provisional application No. 60/185,135, filed on Feb. 25, 2000, and provisional application No. 60/160,759, filed on Oct. 21, 1999.

(51) Int. Cl.[7] .............................................. G06F 12/00
(52) U.S. Cl. ...................... 711/170; 711/221; 711/202; 711/6; 709/314
(58) Field of Search ................................ 711/221, 170, 711/202, 6; 709/319

(56) References Cited

U.S. PATENT DOCUMENTS 6,442,663 B1 * 8/2002 Sun et al. .................... 711/202

OTHER PUBLICATIONS

Smith et al. "Heterogeneous Process Migration: The Tui System," Feb. 28, 1996 Department of Computer Science, University of British Columbia.*

Smith et al. "Heterogeneous Process Migration: The Tui System," Mar. 14, 1997 Department of Computer Science, University of British Columbia.*

Ferrari et al. "Process Introspection: A Heterogeneous Checkpoint/Restart Mechanism Based on Automatic Code Modification" Technical report CS–97–05 Department of Computer Science, University of Virginia.*

Young et al. "The Duality of Memory and Communication in the Implementation of a Multiprocessor Operation System" 1987 Conference proceedings on Object–oriented programming systems, languages and applications ACM.*

* cited by examiner

Primary Examiner—Mano Pandmanabhan
Assistant Examiner—Paul Baker
(74) Attorney, Agent, or Firm—Ditthavong & Carlson, P.C.

(57) ABSTRACT

A method and software for managing memory are provided in which objects residing in session memory are formatted so the references contained in the objects are in a machine-independent format, namely, that the references are encoded numerically. An exit table is provided to handle references with session memory that refer to locations in call memory, in which each entry in the exit table is associated with a corresponding reference in session memory and contains a pointer to the location in call memory.

16 Claims, 5 Drawing Sheets

MEMORY MANAGEMENT USING MIGRATION FOR A RUN-TIME ENVIRONMENT

RELATED APPLICATIONS

The present application claims the benefit of the following U.S. Provisional Patent Applications, the contents of all of which are incorporated by reference in their entirety:

U.S. Provisional Patent Application Serial No. 60/160,759 entitled USE OF A JAVA VM INSTANCE AS THE BASIC UNIT OF USER EXECUTION IN A SERVER ENVIRONMENT, filed on Oct. 21, 1999 by Harlan Sexton et al., U.S. Provisional Patent Application Serial No. 60/185,136 entitled MEMORY MANAGEMENT USING MIGRATION FOR A RUN-TIME ENVIRONMENT, filed on Feb. 25, 2000 by Harlan Sexton et al., U.S. Provisional Patent Application Serial No. 60/185,139 entitled METHOD AND ARTICLE FOR MANAGING REFERENCES BETWEEN OBJECTS IN MEMORIES OF DIFFERENT DURATIONS IN A RUN-TIME ENVIRONMENT, filed on Feb. 25, 2000 by Harlan Sexton., U.S. Provisional Patent Application Serial No. 60/185,138 entitled STATIC OBJECT SYSTEM AND METHODOLOGY FOR IMPLEMENTING A RUN-TIME ENVIRONMENT, filed on Feb. 25, 2000 by Harlan Sexton et al.

U.S. Provisional Patent Application Serial No. 60/185,134 entitled AURORA NATIVE COMPILATION, filed on Feb. 25, 2000 by Dmitry Nizhegorodov U.S. Provisional Patent Application Serial No. 60/185,137 entitled ACCESSING SHORTER-DURATION INSTANCES OF ACTIVATABLE OBJECTS BASED ON OBJECT REFERENCES STORED IN LONGER-DURATION MEMORY, filed on Feb. 25, 2000 by Harlan Sexton et al. and U.S. Provisional Patent Application Serial No. 60/185,135 entitled HANDLING CALLOUTS MADE BY A MULTI-THREADED VIRTUAL MACHINE TO A SINGLE THREADED ENVIRONMENT, filed on Feb. 25, 2000 by Scott Meyer The present application is related to the following commonly-assigned, co-pending U.S. Patent Applications, the contents of all of which are incorporated by reference in their entirety:

U.S. patent application Ser. No. 09/248,295 entitled MEMORY MANAGEMENT SYSTEM WITHIN A RUN-TIME ENVIRONMENT, filed on Feb. 11, 1999 by Harlan Sexton et al.

U.S. patent application Ser. No. 09/248,291 entitled MACHINE INDEPENDENT MEMORY MANAGEMENT SYSTEM WITHIN A RUN-TIME ENVIRONMENT, filed on Feb. 11, 1999 by Harlan Sexton et al.

U.S. patent application Ser. No. 09/248,294 entitled ADDRESS CALCULATION OF INVARIANT REFERENCES WITHIN A RUN-TIME ENVIRONMENT, filed on Feb. 11, 1999 by Harlan Sexton et al.

U.S. patent application Ser. No. 09/248,297 entitled PAGED MEMORY MANAGEMENT SYSTEM WITHIN A RUN-TIME ENVIRONMENT, filed on Feb. 11, 1999 by Harlan Sexton et al.

U.S. patent application Ser. No. 09/320,578 entitled METHOD AND ARTICLE FOR ACCESSING SLOTS OF PAGED OBJECTS, filed on May 27, 1999 by Harlan Sexton et al.

U.S. patent application Ser. No. 09/320,578 entitled METHOD AND ARTICLE FOR MANAGING REFERENCES TO EXTERNAL OBJECTS IN A RUN-TIME ENVIRONMENT, filed on May 27, 1999 by Harlan Sexton et al.

U.S. patent application Ser. No. 09/512,619 entitled METHOD FOR MANAGING MEMORY USING EXPLICIT, LAZY INITALIZATION IN A RUN-TIME ENVIRONMENT, filed on Feb. 25, 2000 by Harlan Sexton et al.

U.S. patent application Ser. No. 09/512,622 entitled METHOD FOR MANAGING MEMORY USING ACTIVATION-DRIVEN INITIALIZATION IN A RUN-TIME ENVIRONMENT, filed on Feb. 25, 2000 by Harlan Sexton et al.

U.S. patent application Ser. No. 09/512,621 entitled SYSTEM AND METHODLOGY FOR SUPPORTING A PLATFORM INDEPENDENT OBJECT FORMAT FOR A RUN-TIME ENVIRONMENT, filed on Feb. 25, 2000 by Harlan Sexton et al.

U.S. patent application Ser. No. 09/512618 entitled METHOD AND APPARATUS FOR MANAGING SHARED MEMORY IN A RUN-TIME ENVIRONMENT, filed on Feb. 25, 2000 by Harlan Sexton et al. and U.S. patent application Ser. No. 09/512,620 entitled USING A VIRTUAL MACHINE INSTANCE AS THE BASIC UNIT OF USER EXECUTION IN A SERVER ENVIRONMENT, filed on Feb. 25, 2000 by Harlan Sexton et al.

FIELD OF THE INVENTION

The present invention relates to computer systems and more particularly to memory management techniques.

BACKGROUND OF THE INVENTION

A dynamic run-time environment for a language such as JAVA™ is responsible for managing memory for objects that are created and destroyed during the execution of a program. An object is an entity that encapsulates data and, in some languages, operations associated with the object. Since the encapsulated data is stored in memory, objects are associated with particular regions of memory that are allocated and deallocated by the dynamic run-time environment.

The state of a program, or "program state," is the set of the objects and the references between the objects that exist at a specific point in time during the execution of the program. A "reference" is used by a run-time environment to identify and ultimately access the region of memory for storing the data of the object. Typically, references between objects in a run-time environment are encoded using machine pointers. A machine pointer is an instance of a native type that contains the address of the object in the main memory, which can be a real memory address or, more commonly, a virtual address on a machine that implements a virtual memory system. Since machine pointers are closely coupled to the underlying hardware and firmware of a computer system, machine pointers have high performance and, hence, are a popular implementation for references.

In a run-time environment, however, managing the program state with machine-specific references such as machine pointers is sometimes disadvantageous. For example, it may be desirable to store the program state on disk or another secondary storage medium and restore the stored program state to main memory. Some run-time environments, in fact, are designed to use the same program state on different types of machines. For instance, such run-time environments provide load-balancing and crash recovery functions by transferring the execution of a program from one machine to another.

Lately, there has been much interest in using JAVA in a multi-user environment that allows multiple users to connect in separate, concurrent sessions to a server system, such as a relational database system. When designing a run-time environment for such a multi-user environment, scalability in terms of the number of simultaneous users who can establish separate sessions is very important. A significant constraint for user scalability is the size of the memory footprint that each session consumes. For example, a server system may have 100 Mb of memory for supporting all the user sessions. If the session memory footprint is 1 Mb, then only 100 users can be supported at one time. Therefore, it is desirable to reduce the session memory footprint to improve scalability.

One approach for reducing the session memory footprint is to provide a shorter duration memory named "call memory" that is active for the duration of a "call" but automatically deallocated when the call terminates. A call is the period of time, when the user is actively using the server, such as processing a SQL statement in a database server. Accordingly, those objects that do not need to live beyond the duration of the call are placed in the call memory rather than session memory. When the call is completed, objects in the call memory are deallocated and the call-duration memory is reclaimed for use. This approach has been implemented in Oracle Corporation's PL/SQL language, for instance, in which objects are explicitly declared as having the duration of a call or of a session. Memory management in such a language is straightforward because the objects are simply allocated in the memory that corresponds to their duration.

JAVA, however, defines the lifetime of many objects, especially system objects, to extend throughout the duration of a session and does not have the notion of a call or call memory. Accordingly, one approach is to simply ignore the provision of the call memory by the multi-user system and allocate every object in session memory, but this approach suffers from scalability because short-lived objects are unnecessarily allocated in session memory. Another approach is to allocate objects first in the shorter-duration call memory, and then, at the time the call terminates, migrate the live objects into the longer duration session memory. Dead objects, i.e. those objects that are no longer needed, are not migrated but are freed when the call memory is deallocated.

In this other approach, session memory is only consumed for the call memory objects that are still alive at the end of the call. Call memory objects are alive if a live object in session memory directly or indirectly refers to the call memory object. One way to identify such live call memory objects is to scan every line object in session memory, but there is a need for a more efficient method identifying call memory objects.

In addition, parallel processing and load balancing are useful techniques for improving performing in a multi-user environment. Parallel processing employs a plurality of computer processors for handling many calls at the same time, and load balancing ensures that idle processors are schedule to perform calls as the calls are made. In fact, the computer processors need not be identical but can be a networked collection of incompatible computers that are capable of accessing the same memory. Thus, it is possible in this environment for one processor to handle a call in a user session, and then another processor to handle the next call in the user session. Accordingly, it is desirable for the session state to be as machine-independent as possible. Call memory, on the other hand, does not need to be machine-independent because a call is typically serviced by only one of the processors at a time.

Differences between computer architectures, however, make machine-independence very difficult to achieve. For example, the size of a machine pointer is dictated by the architecture of the computer system. While many computer systems today employ 32-bit machine pointers, older microprocessors typically used 16-bit machine pointers and the latest computer processors are adopting 64-bit pointers. On some 64-bit machines, such as a Cray™ supercomputer, all pointers are 64-bits long, and there is no native operation to fetch a smaller sized machine pointer. As another example, the significance and ordering of bytes in the pointer ("endianness") may vary from processor model to processor model.

One approach for addressing machine independence, known as "pointer swizzling," employs two completely different formats for representing references: a machine-dependent runtime format using pointers for references in main memory, and a platform invariant format for encoding references in secondary storage. When the reference is written to secondary storage, machine pointers are converted into a machine-independent symbol such as a string or a serial number. When the reference is read back into main memory from secondary storage, the symbol is unswizzled and converted back into a machine pointer. Swizzling is also referred to as "serialization" and "pickling."

The swizzling and the unswizzling operations, however, are computationally expensive, requiring many memory accesses into an auxiliary symbol table, typically implemented by a hash table or binary tree stored in memory. Thus, frequent storage and retrieval of program state into and out of secondary storage can be responsible for a significant drain on system performance. Therefore, a need exists for supporting an inexpensive platform-independent format for objects.

SUMMARY OF THE INVENTION

This need and others are addressed by one aspect of the present invention, in which objects residing in session memory are formatted so the references contained in the objects are in a machine-independent format, namely, that the references are encoded numerically. A exit table is provided to handle references with session memory that refer to locations in call memory, in which each entry in the exit table is associated with a corresponding reference in session memory and contains a pointer to the location in call memory. Thus, the exit table provides a convenient mechanism for identifying which objects in call memory are still alive because they are directly or indirectly referenced by session memory objects.

It is desirable to update the exit table efficiently. Another aspect of the invention is directed to maintaining an exit table, in which once an entry in the exit table is created for a particular reference in a memory space such as session memory, all further assignments to that reference are recorded in the exit table entry, even if the new value of the reference refers to a location that is inside the memory space.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

Methods and apparatus for managing memory are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
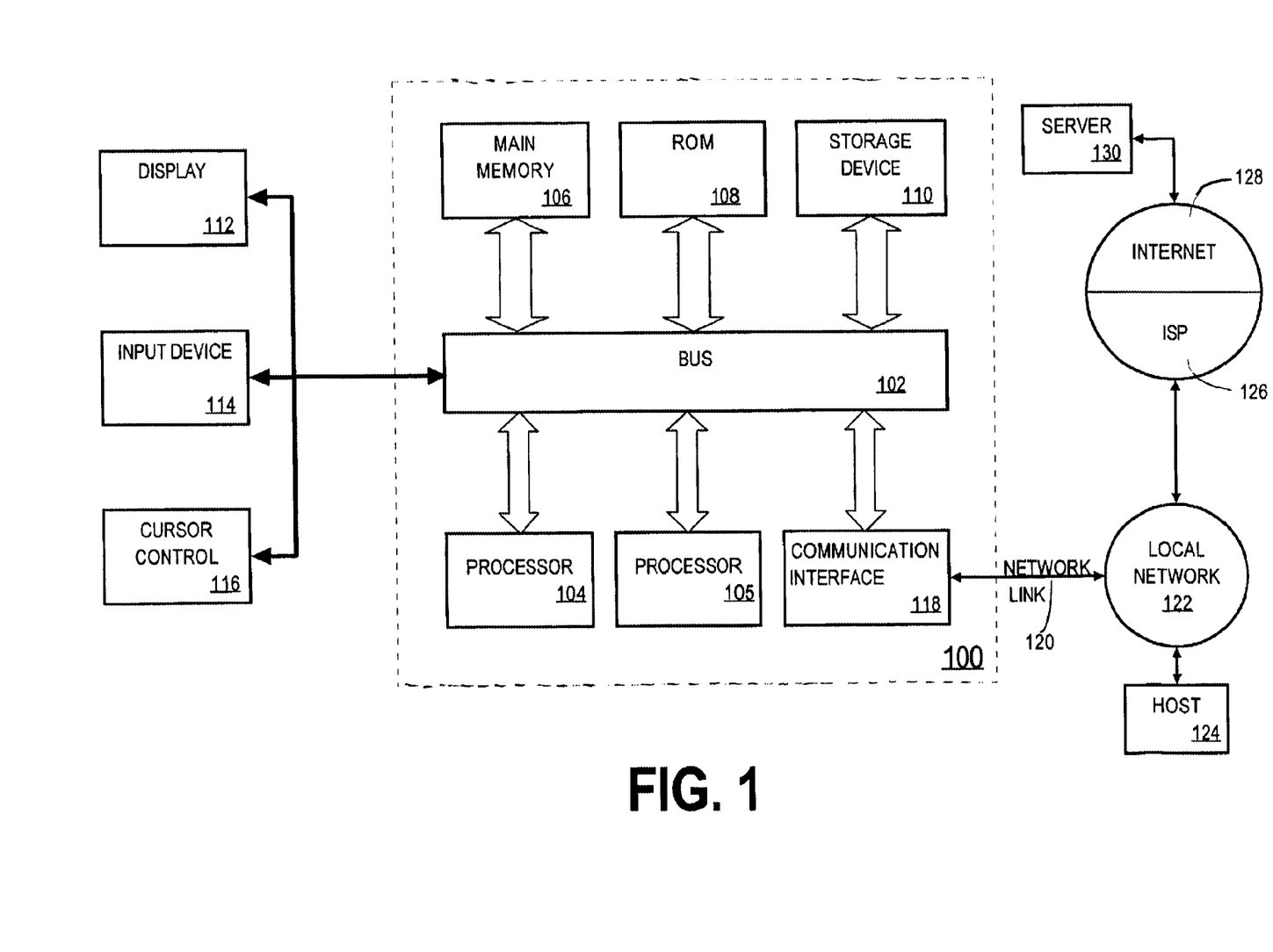
FIG. 1 is a block diagram that illustrates a computer system upon which an embodiment of the invention may be implemented.

FIG. 1 is a block diagram that illustrates a computer system 100 upon which an embodiment of the invention may be implemented. Computer system 100 includes a bus 102 or other communication mechanism for communicating information, and processors 104 and 105 both coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104 and processor 105. Computer system 100 further includes a read only memory (ROM) 108 or other static storage device coupled to bus 102 for storing static information and instructions for processor 104 and processor 105. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for memory management in a run-time environment. According to one embodiment of the invention, managing memory in a run-time environment is provided by computer system 100 in response to processor 104 and/or processor 105 executing one or more sequences of one or more instructions contained in main memory 106. Such instructions may be read into main memory 106 from another computer-readable medium, such as storage device 110. Execution of the sequences of instructions contained in main memory 106 causes processor 104 and/or processor 105 to perform the process steps described herein. Although FIG. 1 depicts a dual processing arrangement with processors 104 and 105, one or more processors in a uni-processing or multi-processing arrangement, respectively, may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 and/or processor 105 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described infra, or any other medium from which a computer can read.

Various forms of computer readable media may be involved in carrying one or more sequences of one or more instructions to processor 104 and/or processor 105 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 and/or processor 105 retrieves and executes the instructions. The instructions received by main memory 106 may optionally be stored on storage device 110 either before or after execution by processor 104 and/or processor 105.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for memory management in a run-time environment as described herein. Processor 104 may execute the received code as it is received, and/or stored in storage device 110, or other non-volatile storage for later execution. In this manner, computer system 100 may obtain application code in the form of a carrier wave.

"Virtual memory" refers to memory addressable by a storage allocation technique in which auxiliary storage, such as memory in storage device 110, can be addressed as though it were part of the main memory 106. More specifically, combinations of hardware, firmware, and operating system cooperate to automatically swap portions of the code and data for an executing process on an as-needed basis. Thus, the virtual address space may be regarded as addressable main memory to a process executing on a computer system that maps virtual addresses into real addresses. The size of the virtual address space is usually limited by the size of a native machine pointer, but not by the actual number of storage elements in main memory 110.

On many operating systems, a process will utilize a certain amount of virtual memory that no other user process may access in order to provide data security. "Shared memory" refers to the virtual address space on the computer system 100 that is concurrently accessible to a plurality of executing user processes on a processor 104. In some embodiments, shared memory is also accessible to executing user processes on a plurality of processors, such as processors 104 and 105.

"Secondary storage" as used herein refers to storage elements, other than virtual memory, accessible to a process. Secondary storage may be local or networked. Local secondary storage, furnished by storage device 100 on computer system 100, is preferably a random access storage device such as a magnetic or optical disk. Networked secondary storage is provided by storage devices on other computer systems, for example on host 124, accessible over a local area network 122, or server 130, accessible over a wide area network such as the Internet.

Memory Model

Figure 2:
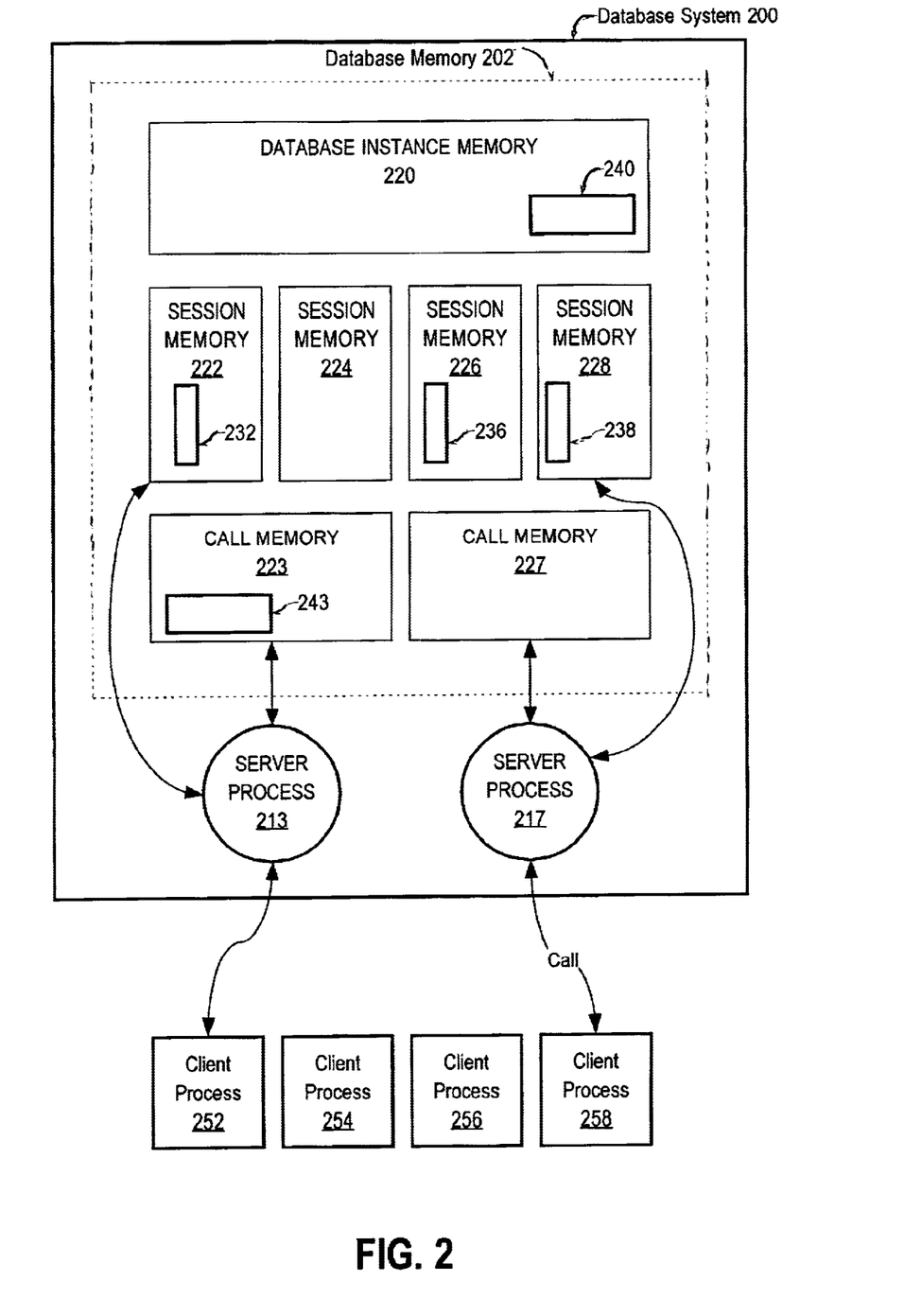
FIG. 2 schematically illustrates a database system with which a run-time environment for a language such as Java is used.

FIG. 2 schematically illustrates a database system 200 with which a run-time environment for a language such as Java is used. In the illustrated configuration, client processes 252, 254, 256, and 258 establish database sessions with the database system 200. A database session refers to the establishment of a connection between a client and a database system through which a series a calls may be made. As long as the client remains connected in the database session, the client and the associated database session are referred to as being active. Active clients can submit calls to the database system 200 to request the database system 200 to perform tasks. One example of a call is a query in accordance with the Structured Query Language (SQL), and another example is a method invocation of a Java object or class, defined for performing a database task for database system 200.

Database system 200 comprises, among other components, a database memory 202 for storing information useful for processing calls and a number of server processes 213 and 217 for handling individual calls. The database memory 202 includes various memory areas used to store data used by server processes 213 and 217. These memory areas include a database instance memory 220, session memories 222, 224, 226, and 228, and call memories 223 and 227. It is to be understood that the number of the session memories and call memories in FIG. 2 is merely illustrative and, in fact, the number of such memories will vary over time as various clients make various calls to the database system 200.

The database instance memory 220 is a shared memory area for storing data that is shared concurrently by more than one process. For example, shared memory area may be used store the read-only data and instructions (e.g. bytecodes of Java classes) that are executed by the server processes 213 and 217. The database instance memory 220 is typically allocated and initialized at boot time of the database system 200, before clients connect to the database system 200.

When a database session is created, an area of the database memory 202 is allocated to store information for the database session. As illustrated in FIG. 2, session memories 222, 224, 226, and 228 have been allocated for clients 252, 254, 256, and 258, respectively, for each of which a separate database session has been created. Session memories 222, 224, 226, and 228 are a shared memory used to store static data, i.e., data associated with a user that is preserved for the duration of a series of calls, especially between calls issued by a client during a single database session. Java class variables are one example of such static data.

A call memory, such as call memory 227, is used to store data that is bounded by the lifetime of a call. When client 258 submits a call to the database system 200, one of server processes 213 or 217 is assigned to process the call. For the duration of the call, the server process is allocated a call memory for storing data and other information for use in processing the call. For example, server process 217 uses call memory 227 and session memory 228 for processing a call submitted by client process 258.

At any given time, a server process is assigned to process a call submitted by a single client. After the server process completes its processing of a call from one client, the server process is free to be assigned to respond to the call of another client. Thus, over a period of time, a server process may be assigned to process calls from multiple clients, and a client may use multiple server processes to handles its various calls. At any given time, the number of calls requiring execution by a server process is typically much fewer than the current number of active clients. Thus, database system 200 is typically configured to execute fewer server processes than the maximum number of active clients.

A PLATFORM INDEPENDENT OBJECT FORMAT

In accordance with one aspect of the invention, each object used in a run-time environment is implemented as a sequence of slots, each slot containing a primitive type. Most of the primitive types, including integers (signed and unsigned), floating point numbers, characters, booleans, etc., are readily implementable on a variety of platforms. For example, a floating point number may be specified as an IEEE single or double precision floating point number, which has a canonical representation that is invariant across platforms.

A reference, however, is a primitive type that does not conventionally have a platform-independent canonical format. For example, references are typically implemented as native machine pointers, which are about as platform-specific as they can be. Therefore, numeric references are used to provide a platform-independent representation for references.

A numeric reference employs a machine-independent format for encoding references between objects that is suitable for both run-time use in virtual memory and storage use in secondary storage. Unlike symbols and strings employed with pointer swizzling, numeric references are easily stored in a secondary storage, in some cases needing no conversion at all and in other cases requiring only minor arithmetic-logical operations such as bit-twiddling and byte rearrangement. For run-time usage, numeric references can be efficiently "dereferenced," that is, converted into a machine pointer, without requiring many memory accesses into an auxiliary symbol table, hash table, tree, or other complex data structure. Therefore, numeric references need not be converted into machines at load time, reducing the overhead of loading program state.

Preferably, numeric references are implemented in a run-time environment that requires all encoded data (e.g. for objects) to be typed and all primitive types, including references, to have an invariant format. For example, a run-time environment may require floating point numbers to use an IEEE format. In such a run-time environment, references between objects, conventionally implemented by machine pointers, are encoded as integer values indicating offsets from an implicit machine pointer. The numeric reference is defined to be invariant, having a specified number of bytes, a specified byte-ordering, and a specified alignment. The implicit machine pointer is a virtual address that is derivable from the memory environment of one the objects.

For example, numeric references may be encoded as a little endian, two's complement (if signed) four-byte integer referring to objects aligned on an eight-byte boundary, although numeric references in accordance with the present invention, of course, are not limited to these particular specifications. Since almost all machines provide a mapping between a numeric type and a native primitive type, accessing data in this format is at least as efficient as, for example, accessing structures generated by C compilers for that machine.

The use of numbers to encode references stems from the realization that the invariant format for encoding objects and primitive types in a run-time environment ensures that every instance of a type will have the same size between platforms. Since every object has a consistent size between platforms, the relative locations between objects are also consistent. Since objects on any platform will be located at a consistent offset from some point in the virtual address space, this offset can be expressed as a consistent number of bytes from a virtual address. Thus, numeric references include an offset portion that indicates a number of bytes from an implicit address. Consequently, numeric references are machine-independent, and program state with numeric references can be used on incompatible processors, such as processors with differently sized machine pointers.

Since a process may use some of its virtual address space for storing non-invariant data, i.e. for purposes other than storing program state, it is useful to define a physical or logical area of the virtual address space in which the offsets between objects remain consistent and thus can be advantageously expressed as numbers. An "object memory" is a subset of the virtual address space containing either existing objects or available space for allocating new objects. Since an object memory is a subset of the virtual address space, numeric references within the object memory can be smaller than machine pointers. For example, 32-bit (four-byte) numeric references can be profitably used on a computer with a 64-bit virtual address space ($2^{64}$, about 16 billion gigabytes). Since one of the impediments to machine-independence is the differing size of machine pointers, the use of fixed-size numeric references, even in very large virtual address spaces, helps in attaining a machine-independent reference format.

In some implementations, a plurality of object memories are provided, for example, to hold objects of different durations, or of other distinct characteristics, to assist in garbage collection. Accordingly, numeric references encode references between objects in the same object memory. References between objects of different object memory, on the other hand, would be encoded in another reference format having the same size as the numeric reference. For example, indexed references, which are described infra, are one type of format that may be used for such inter-object memory references.

In contrast to symbols swizzled from machine pointers, numeric references are easily converted into and from machine pointers. In general, a numeric reference to an object is converted into a machine pointer to the object by adding an offset contained in the numeric reference to an implicit virtual address. Conversely, a machine pointer to the object is converted into a numeric reference by calculating a pointer difference between the machine pointer to the object and the implicit virtual address. The implicit virtual address points to the beginning of a region of the virtual memory space in which the referencing object or the referenced object is located. The precise identity of the implicit virtual address depends more specifically on the species of the numeric reference that is employed.

Three numeric references include: (1) a base-offset numeric reference, which contains an offset relative to a "base address" at the beginning of the object memory, especially if the object memory consists of a contiguous segment of memory, (2) a page-offset numeric reference that is relative to the start of a page also specified in the numeric reference, and (3) a self-relative numeric reference that is relative to the beginning of the referencing object.

Pointer and Reference Tagging

As mentioned earlier, some embodiments restrict the use of numeric references for encoding references between objects in the same object memory. Accordingly, indexed references provide a mechanism for supporting references between objects of different object memories. Reference tagging also allows numeric references to be used in conjunction with other reference types. For example, an indexed reference is a type of reference that evaluates to an array entry of one sort or another. Some of the non-tag bits of the indexed reference specify the array and others specific an index into the array.

According to one embodiment, references are tagged to indicate whether the references are intra-object memory numeric references or indexed references. In other words, a certain number of bits in a reference, for example the higher-order bits or lower-order bits, are reserved for distinguishing between intra-object memory numeric references and indexed references. The information embedded within the reference, which is likely to be sitting in a fast-access machine register, can therefore be retrieved very quickly, without requiring additional memory cycles to fetch the header of the referenced object.

A preferred implementation of reference tagging introduces an alignment invariant and then exploits the alignment invariant in a run-time environment to encode the information in the lower-order bits. Specifically, objects managed by the run-time environment are stored at an N-bit aligned address, or, in other words, the storage for these objects begins at virtual addresses at $2^N$-byte boundaries. For example, if the objects can be stored at three-bit aligned addresses, that is, on $2^3=8$ byte boundaries, a legal start address for such an object might be 0×20446740, but an address such as 0×20446743 is not a valid start address for the storage of an object. Consequently, the three least significant bits of the reference do not serve to differentiate different objects, since only one of the eight values for the three least significant bits is a legal address and the remaining seven values do not point to any other object. Given this alignment restriction, references that resolve to addresses 0×20446740 through 0×20446747 effectively refer to the same object.

Therefore, any of the N least significant bits of a reference to an N-bit aligned object can be used as a tag to encode other information, namely the format of the numeric reference and storage properties of the referenced object. The remaining portion of a pointer holds the aligned address of the object, and the remaining portion of the numeric reference contains the offset for the numeric reference and other information important for the particular format of the numeric reference, such as the page number. For example, tag values of 1 and 5 of a reference may indicate an indexed reference, while other tag values indicate an inter-object memory numeric references. In addition, the tag may distinguish different types of numeric references. One other type of numeric reference is a self-relative numeric reference, which encodes the location of a referenced object as an offset to the address of the referencing object.

Exit Table

Figure 3A:
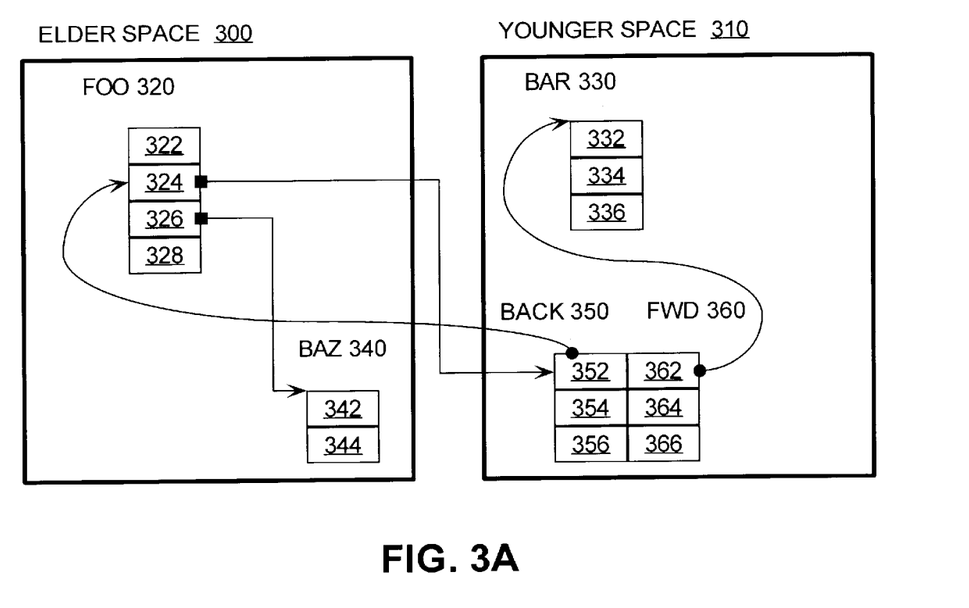
FIG. 3A depicts a memory system in accordance with one embodiment.

As described herein above, there is a need for an efficient mechanism to identify those objects in call memory that should be migrated to session memory at the end of a call, because they are referred to by session memory object. In one embodiment of the invention, accordingly, an exit table is provided to coordinate the referencing of call memory objects by session memory objects, collecting in a convenient data structure the references from session memory into call memory. FIG. 3A depicts a memory system containing an elder space 300 and a younger space 310. The elder space 300 holds objects that have lived a longer time than the younger space 310. In this embodiment, the elder space 300 is the session memory, and the younger space 310 is the call memory, but the concepts disclosed herein are not so limited and may be applied, for example, in any generational memory systems.

Object "foo" 320 having four fields or "slots" 322, 324, 326, and 328 is stored in elder space 300. Slot 326 contains a numeric reference, such as a self-relative reference to object "baz" 340, which has slots 342 and 344. Slot 324 contains an indexed reference to ultimately refer to object "bar" 330 in younger space 310. Object "bar" 330 contains three slots 332, 334, and 336.

An exit table 360, illustrated with three entries of forwarding pointers 362, 364, and 366, is provided within younger space 310, though in alternative embodiments, the exit table 360 may be located in elder space 300. An exit table 360 is a data structure that records the references within a memory space that refer to objects outside of the memory space.

Slot 324 contains an indexed reference that indicates a particular entry in an exit table 360. For example, the indexed reference at the location for slot 324 may contain information, such as an index of 0, that identifies entry 0 in the exit table 360. The corresponding entry contains a pointer 362 to object "bar" 332. The exit table 360 itself is preferably located in a known place in younger space 310 as indicated, for example, by a pointer in a global variable or data structure. Thus, exit table 360 provides a way for objects in the elder space 300 to refer to object in the younger space 310 with machine-independent numerically encoded references.

In one embodiment, it is convenient to provide a back pointer vector 350, corresponding and pointing to the same locations in the elder space 330 that the entries of the exit table 360 correspond to. For example, since entry 362 of exit table 360 corresponds to the location of slot 324, the parallel entry 352 in the back pointer vector 350 also corresponds to, and in fact points to, the location of slot 324. The back pointer vector 350 can be part of the exit table 360 or merely parallel to the exit table 360. Although the exit table 360 and the back pointer vector 350 are illustrated as residing in the younger space 310, the present invention is not so limited and the exit table 360 and the back pointer vector 350 may reside in other memory spaces, including elder space 300, and the exit table 360 need not even reside in the same memory space as the back pointer vector 350.

Figure 4:
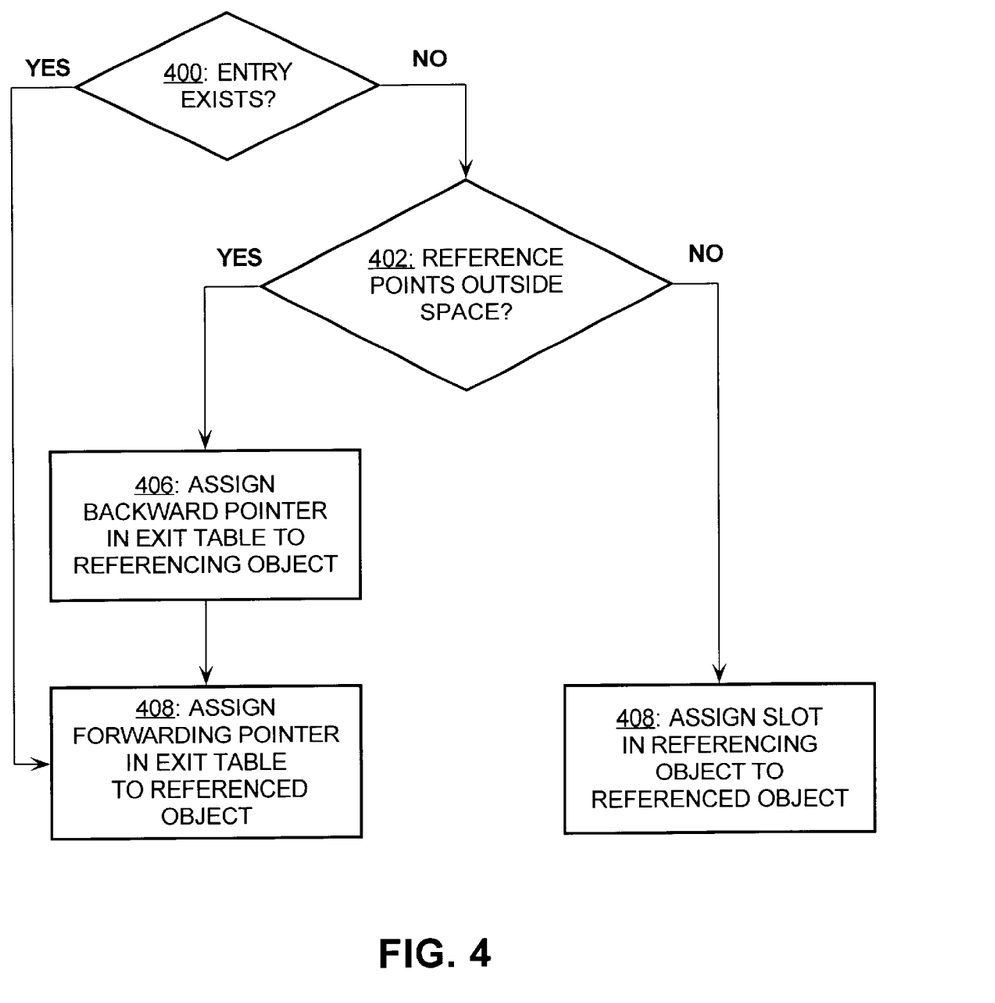
FIG. 4 is a flow diagram illustrating the operation of updating a exit table in accordance with one embodiment of the invention.

FIG. 4 is a flow diagram illustrating the operation of updating the exit table 360, in accordance with one embodiment of the invention, when an assignment is made to a slot stored in elder space 300 to point to a referenced object. At step 400, the exit table 360 is checked to determine if an entry in the exit table 360 already exists for the location of the slot. This test can be made inexpensively by examining the tag of the current reference in the slot, or more expensively by scanning the back pointer vector 350. If an entry already exists in the exit table 360, then execution branches to step 408, where the corresponding forwarding pointer (e.g. forwarding pointer 362) is set to point to the object.

On the other hand, if the entry does not already exists, then the referenced object is checked at step 402 to determine if the referenced object is outside of elder space 300. This test can be made inexpensively by examining the tag of a pointer to the referenced object or more expensively by examining the address of the referenced object. For example, the tag could indicate whether the referenced object is in elder space 300 or younger space 310; thus, the test merely checks certain bits of the pointer. Alternatively, the value of the pointer to the referenced object can be compared to determine if the pointer fall within ranges that correspond to elder space 300 or younger space 310.

If the object is inside the elder space 320, there is no need to add this entry to the exit table 360. In this case, a numeric reference is generated and stored in the slot in the referencing object to refer to the referenced object (step 410).

If, on the other hand, the referenced object is outside the elder space 300, then a new entry in the back pointer vector 350 and the exit table 360 is obtained, for example, by incrementing a frontier pointer at the current end of those data structures. The new entry in the back pointer vector 350 is set to point to the location of the slot of the referencing object that is being assigned (step 406) and the new entry in the exit table 360 is set to point to referenced object (step 408). Finally, an indexed reference containing an index to the new entry is generated and stored in the slot in the referencing object to refer to the referenced object via the exit table 360.

It is important to note that, in this embodiment, once an exit table 360 entry has been set up for a particular location of a slot in elder space 300, all subsequent assignments of references to that slot for at least the rest of the call are made through the corresponding exit table 360 even when the object the reference refers to is in the elder space 300. This policy avoids having to create a second entry in the exit table 360 for the next time the slot is set to refer to an object outside of the elder space 300.

Figure 5:
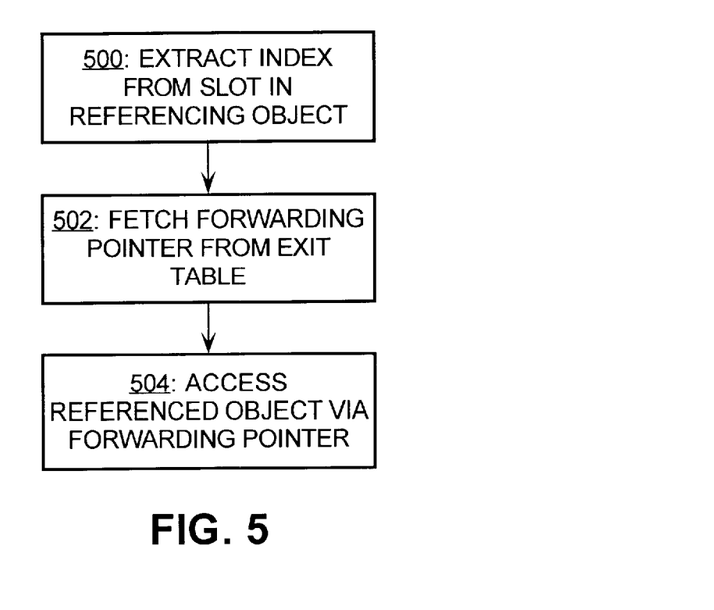
FIG. 5 is a flow diagram illustrating how an indexed reference into an exit table is deferenced in accordance with one embodiment.

FIG. 5 is a flow diagram illustrating how an indexed reference into an exit table is deferenced in accordance with one embodiment. At step 500, an index is extracted from the slot in the referencing slot. For slot 324, for example, the index value of 0 would be extracted. At step 502, the index is used to go to the corresponding entry in the exit table 360, located at a known place, to obtain the forwarding pointer. In the example, the index value of 0 corresponds to the first entry with forwarding pointer 362. Finally, at step 504, the referenced object is accessed via the forwarding pointer 362, for example, by a normal machine pointer dereference. In the example, object "bar" 330 is accessed by forwarding pointer 362.

Figure 6:
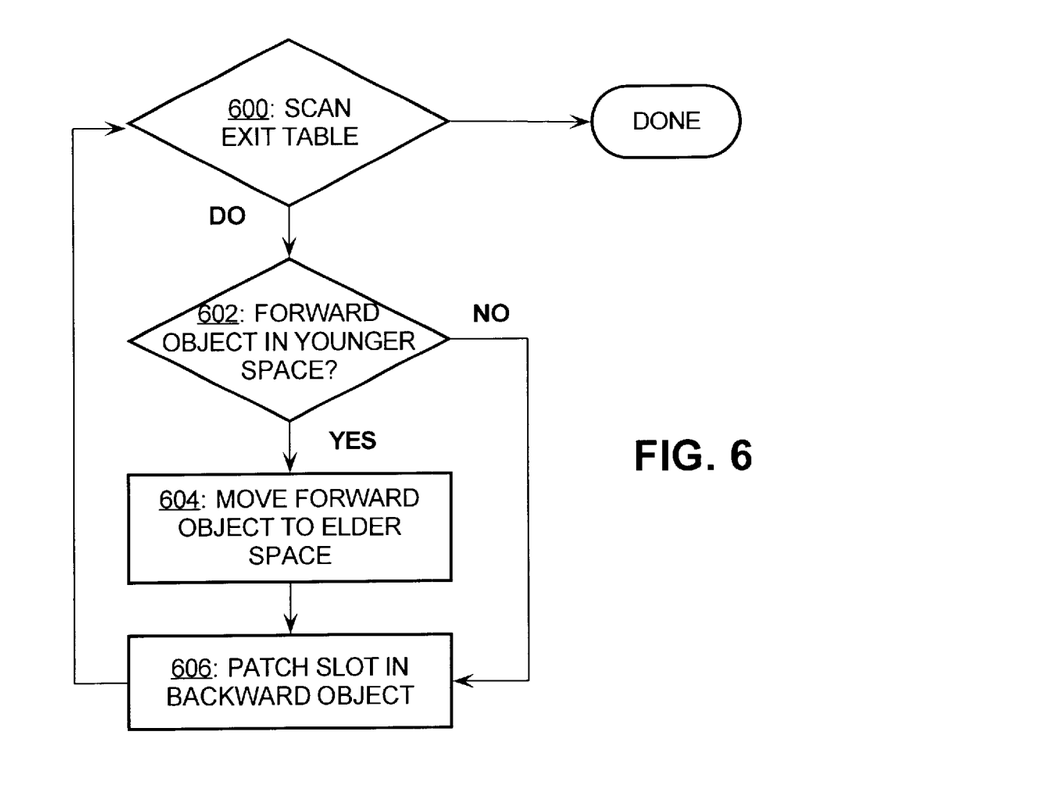
FIG. 6 is a flow diagram illustrating the operation of an end-of-call migration in accordance with an embodiment.

The exit table 360 is also useful for end-of-call migration as well as other forms of generational scavenging. FIG. 6 is a flow diagram illustrating the operation of scavenging the younger space 310, for example, at the end of a call. Block 600 controls a loop in which each entry in the exit table 360 is scanned. For each entry, blocks 602, 604, and 606 are performed.

At block 602, the entry of the exit table 360 is checked to determine if the object that the forwarding pointer points to is in the younger space 310. If the forwarding pointer does not point to an object in the younger space 310, then execution skips block 604 and proceeds to block 606. In the example illustrated in FIG. 3A, concerning the entry with forwarding pointer 362, the pointed to object, object "bar" 330, is indeed in the younger space 310. Therefore, in this example, execution proceeds to block 604.

At block 604, the object in younger space 310 is migrated to elder space 300. In the example, object "bar" 310, being pointed to be forwarding pointer 362 in exit table 360, is moved into elder space 300. In one embodiment, if the migrated object points to objects outside the elder space 300, then new entries are appended entries to the exit table 360 for those referenced objects. As a result, objects are recursively migrated into the elder space 300.

Figure 3B:
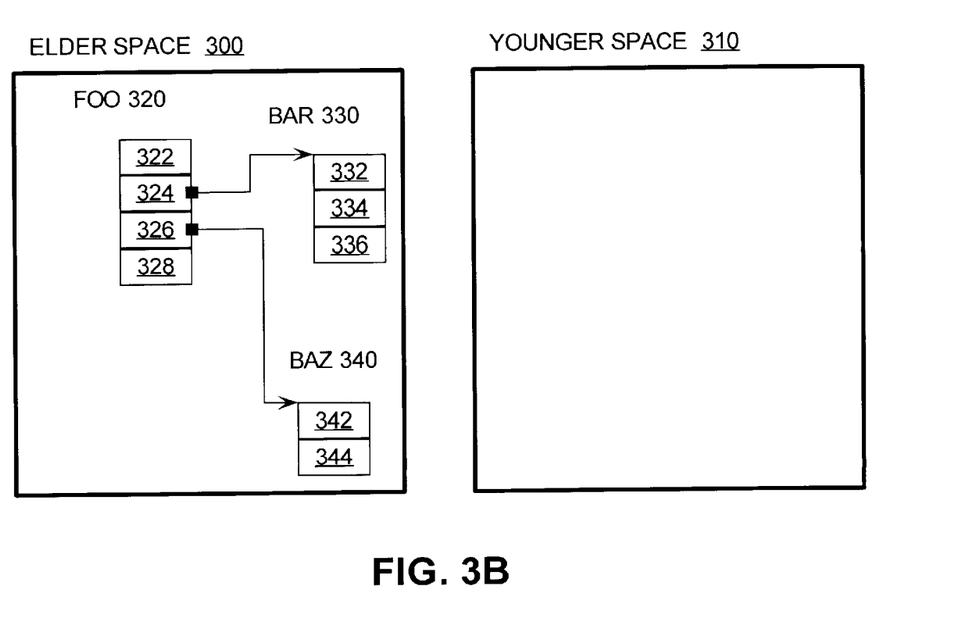
FIG. 3B depicts a memory system in accordance with one embodiment.

At block 606, the slot that had an indexed reference into the exit table 360 is patched to refer to the migrated object, preferably using the back pointer to identify the location that needs patch. In the example, object "bar" 330 was migrated into elder space 300; thus, slot 324, pointed to by back pointer 352 is patched to refer directly to object "bar" 330, for example, with a self-relative numeric reference. As result of this migration is illustrated in FIG. 3B, in which object "bar" 330 is now located in elder space 300.

Accordingly, by collecting the references from elder 300 into a common data structure, namely exit table 360, it is easy to determine, simply by iterating through the exit table 360, which objects in younger space 310 that are referenced by objects in elder space 300 and are therefore still alive.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method for managing memory, comprising the steps of:
   maintaining an exit table having entries corresponding to respective first locations in the first memory space and pointing to respective memory locations;
   assigning a reference within a first location in the first memory space, said reference indicating a second location, said assigning including the steps of:
      determining if there is an entry in the exit table corresponding to the first location in the first memory space;
   if there is an entry in the exit table corresponding to the first location in the first memory space, then setting the entry to point to the second location.

2. The method according to claim 1, wherein the second location is in the first memory space.

3. The method according to claim 1, wherein said assigning further includes the step of:
   if there is not an entry in the table corresponding to the first location in the first memory space, then performing the steps of:
      determining if the second location is in a second memory space; and
   if the second location is in the second memory space, then creating an entry to correspond to the first location in the first memory space and to point to the second location.

4. The method according to claim 1, further comprising the step of maintaining a table of back pointers, said table having entries corresponding and pointing to the respective locations in the first memory;
   wherein said determining includes the step of scanning the table of back pointers.

5. A method for managing memory, comprising the steps of:
- formatting first references at respective first locations in a first memory space as numbers;
- formatting second references at respective second locations in a second memory space as machine pointers; and
- maintaining an exit table for the first memory space, said exit table having entries corresponding respectively to the first locations in the first memory space and containing respective forwarding pointers to a corresponding memory locations, some of said corresponding memory locations being located in the second memory space.

6. The method according to claim 5, further comprising the step of dereferencing one of the first references that is located at one of the first locations by:
- extracting an index from the one of the first references;
- fetching one of the pointers from one of the entries that corresponds to the one of the first references; and
- dereferencing the one of the pointers.

7. The method according to claim 5, further comprising the step of:
- scanning the table to identify objects located in the second memory space that are alive; and
- migrating the identified objects to new locations in the first memory space.

8. The method according to claim 7, wherein said migrating includes:
- patching at least some of the first references to refer to the migrated objects.

9. A computer-readable medium bearing instructions for managing memory, said instructions being arranged to cause one or more processors upon execution thereby to perform the steps of:
- maintaining an exit table having entries corresponding to respective first locations in the first memory space and pointing to respective memory locations;
- assigning a reference within a first location in the first memory space, said reference indicating a second location, said assigning including the steps of:
  - determining if there is an entry in the exit table corresponding to the first location in the first memory space;
  - if there is an entry in the exit table corresponding to the first location in the first memory space, then setting the entry to point to the second location.

10. The computer-readable medium according to claim 9, wherein the second location is in the first memory space.

11. The computer-readable medium according to claim 9, wherein said assigning further includes the step of:
- if there is not an entry in the table corresponding to the first location in the first memory space, then performing the steps of:
  - determining if the second location is in a second memory space; and
- if the second location is in the second memory space, then creating an entry to correspond to the first location in the first memory space and to point to the second location.

12. The computer-readable medium according to claim 9, further comprising the step of maintaining a table of back pointers, said table having entries corresponding and pointing to the respective locations in the first memory;
- wherein said determining includes the step of scanning the table of back pointers.

13. A computer-readable medium bearing instructions for managing memory, said instructions being arranged to cause one or more processors upon execution thereby to perform the steps of:
- formatting first references at respective first locations in a first memory space as numbers;
- formatting second references at respective second locations in a second memory space as machine pointers; and
- maintaining an exit table for the first memory space, said exit table having entries corresponding respectively to the first locations in the first memory space and containing respective forwarding pointers to a corresponding memory locations, some of said corresponding memory locations being located in the second memory space.

14. The computer-readable medium according to claim 13, further bearing instructions for performing the step of dereferencing one of the first references that is located at one of the first locations by:
- extracting an index from the one of the first references;
- fetching one of the pointers from one of the entries that corresponds to the one of the first references; and
- dereferencing the one of the pointers.

15. The computer-readable medium according to claim 13, further bearing instructions for performing the step of:
- scanning the table to identify objects located in the second memory space that are alive; and
- migrating the identified objects to new locations in the first memory space.

16. The computer-readable medium according to claim 15, wherein said migrating includes:
- patching at least some of the first references to refer to the migrated objects.

* * * * *